(12) United States Patent
Rodriguez Bravo et al.

(10) Patent No.: US 11,164,465 B2
(45) Date of Patent: Nov. 2, 2021

(54) REAL-TIME IDENTIFICATION AND PROVISION OF PREFERRED FLIGHT PARAMETERS

(71) Applicant: INTERNATIONAL BUSINESS MACHINES CORPORATION, Armonk, NY (US)

(72) Inventors: Cesar Augusto Rodriguez Bravo, San Rafael de Alajuela (CR); Erich D. Walls, Valparaiso, IN (US); Heiner Valverde Vargas, Heredia (CR); Neil Sahota, Costa Mesa, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 333 days.

(21) Appl. No.: 15/796,171

(22) Filed: Oct. 27, 2017

(65) Prior Publication Data
US 2019/0130769 A1  May 2, 2019

(51) Int. Cl.
*G08G 5/00* (2006.01)
*B64D 45/00* (2006.01)
(Continued)

(52) U.S. Cl.
CPC ............ *G08G 5/0047* (2013.01); *B64D 45/00* (2013.01); *G01C 23/005* (2013.01); *G05B 6/00* (2013.01);
(Continued)

(58) Field of Classification Search
CPC .. G08G 5/0047; G08G 5/0091; G08G 5/0056; G08G 5/0021; G08G 5/003;
(Continued)

(56) References Cited

U.S. PATENT DOCUMENTS 5,890,079 A    3/1999  Levine
6,314,362 B1  11/2001  Erzberger et al.
(Continued)

FOREIGN PATENT DOCUMENTS

CN    106779240 A    5/2017
CN    107272654 A   10/2017

OTHER PUBLICATIONS

International Search Report and Written Opinion for PCT/IB2018/058189 dated Feb. 12, 2019, 9 pgs.
(Continued)

*Primary Examiner* — Mathew Franklin Gordon
(74) *Attorney, Agent, or Firm* — Michael O'Keefe; Matthew M. Hulihan; Heslin Rothenberg Farley & Mesiti PC

(57) ABSTRACT

Real-time identification and provision of preferred flight parameters is provided by obtaining flight data of aircraft flights and classifying the flight data according to categories, acquiring current flight parameters from devices of an aircraft during an in-process flight, comparing the current flight parameters to the classified flight data and identifying, in real-time during the in-process flight, and based on thresholds in correlations between the current flight parameters and the classified flight data, preferred action(s) to take and preferred flight parameter value(s) for the in-process flight given current conditions of the aircraft and surrounding environment as reflected by the current flight parameters, and providing the preferred flight parameter values to computer system(s) of the aircraft.

23 Claims, 7 Drawing Sheets

(51) Int. Cl.
*G01C 23/00* (2006.01)
*G06N 5/04* (2006.01)
*G06N 99/00* (2019.01)
*G09B 9/08* (2006.01)
*G07C 5/08* (2006.01)
*G05B 6/00* (2006.01)
*G06N 20/00* (2019.01)

(52) U.S. Cl.
CPC .............. *G06N 5/04* (2013.01); *G06N 20/00* (2019.01); *G07C 5/08* (2013.01); *G08G 5/0021* (2013.01); *G08G 5/0052* (2013.01); *G08G 5/0056* (2013.01); *G08G 5/0091* (2013.01); *G09B 9/08* (2013.01)

(58) Field of Classification Search
CPC . G09B 9/08; G06N 5/04; G06N 20/00; G01C 23/005; B64D 45/00
See application file for complete search history.

(56) References Cited

U.S. PATENT DOCUMENTS

| | | | | |
|---|---|---|---|---|
| 9,542,851 | B1* | 1/2017 | Kim, II | G08G 5/0047 |
| 2006/0126608 | A1* | 6/2006 | Pereira | G05B 13/042 |
| | | | | 370/360 |
| 2006/0142903 | A1 | 6/2006 | Padan | |
| 2014/0129058 | A1 | 5/2014 | Elahi et al. | |
| 2014/0222337 | A1 | 8/2014 | McGregor et al. | |
| 2014/0343765 | A1 | 11/2014 | Suiter et al. | |
| 2016/0196696 | A1* | 7/2016 | Pereira | G07C 5/008 |
| | | | | 701/31.4 |
| 2017/0011637 | A1* | 1/2017 | Woicekowski | G08G 5/0043 |
| 2017/0144755 | A1* | 5/2017 | Howard | B64C 39/024 |
| 2017/0291711 | A1 | 10/2017 | Litwinowicz et al. | |
| 2019/0035178 | A1* | 1/2019 | Kim, II | G08G 5/0021 |
| 2019/0263534 | A1* | 8/2019 | Da Silva Rocha | B64D 45/00 |

OTHER PUBLICATIONS

Rapolu, B., "Internet of Aircraft Things: An Industry Set to be Transformed", AviationWeek.com, Jan. 18, 2016, 3 pgs.
Jenner, G., "Analysis: How airlines are tapping into the Internet of Things", GE Reports, 2017, 9 pgs.
Stengel, R., "Toward Intelligent Flight Control", IEEE Transactions on Systems, Man, and Cybernetics, vol. 23, No. 3, Nov./Dec. 1993, pp. 1699-1717.
Sheorey Digital Systems Pvt. Ltd., ARMS® V2—Aviation Resource Management System, 1 pg.
Pohl, T., "How Big Data Keeps Planes in the Air", Forbes / Business, SAPVoice, Feb. 19, 2015, 5 pgs.
"Exploring the Dark Side of SETI Data" (video), [retrieved on Aug. 23, 2017]. Retrieved from the Internet: <URL: https://www.ibm.com/analytics/us/en/>, IBM Analytics, 5 pgs.
Krishnakumar, K., "Intelligent Systems for Aerospace Engineering—An Overview", NASA Ames Research Center, 15 pgs.
Mell, Peter, et al., "The NIST Definition of Cloud Computing", NIST Special Publication 800-145, Sep. 2011, Gaithersburg, MD, 7 pgs.
Veselinovic, M., "World's fastest in-flight broadband coming to Lufthansa", [retrieved on Oct. 17, 2017]. Retrieved from the Internet: < URL: http://edition.cnn.com/travel/article/inmarsat-in-flight-wi-fi/index.html>, CNN, Business Traveller, updated Oct. 8, 2015, 3 pgs.
Savvides, L., "Look! A plane with Wi-Fi that doesn't suck", [retrieved on Oct. 17, 2017]. Retrieved from the Internet: <URL: https://www.cnet.com/news/in-flight-wi-fi-fast-honeywell-connected-plane/ >, Jun. 8, 2017, 5 pgs.
Wong, R., "Upgrades will make Gogo in-flight Wi-Fi actually usable in 2018", [retrieved on Oct. 17, 2017]. Retrieved from the Internet: <URL: http://mashable.com/2016/09/29/gogo-faster-in-flight-wifi-2018/#jFSxmbR4Cqqm >, Sep. 29, 2016, 3 pgs.

* cited by examiner

REAL-TIME IDENTIFICATION AND PROVISION OF PREFERRED FLIGHT PARAMETERS

BACKGROUND

Current airplanes and other aircraft include systems that can generate and gather very large amounts of data, in some cases 40-80 terabytes of data per hour. Multiplying that data rate for each aircraft of a sizable aircraft fleet, for instance that of a commercial airline, provides an amount of data that is very difficult, and likely impossible, to review and process in any reasonable amount of time. However, airlines currently allow that data and potentially valuable information to be gleaned therefrom go to waste because they are not capable of handling that volume of information.

As technology evolves, airplanes include more complex computers and systems to improve aspects of the flight, such as security and efficiency as examples. However, as noted, the knowledge generated after each flight is effectively lost when the pilot leaves the plane. It may be the case that for a same airplane flying in the same conditions along a same route different flight results may be realized due to the particular pilots/crew handling the flight. In other words, pilot experience and knowledge is relevant in flight execution.

SUMMARY

Shortcomings of the prior art are overcome and additional advantages are provided through the provision of a computer-implemented method. The method obtains flight data of aircraft flights and classifies the flight data according to categories. The method acquires current flight parameters from devices of an aircraft during an in-process flight. The method compares the acquired current flight parameters to the classified flight data and identifies, in real-time during the in-process flight, and based on thresholds in correlations between the acquired flight parameters and the classified flight data, preferred action(s) to take and preferred flight parameter value(s) for the in-process flight given current conditions of the aircraft and surrounding environment as reflected by the acquired current flight parameters. The method also provides the preferred flight parameter values to computer system(s) of the aircraft.

Further, a computer system is provided that includes a memory and a processor in communication with the memory, where the computer system is configured to perform a method. The method obtains flight data of aircraft flights and classifies the flight data according to categories. The method acquires current flight parameters from devices of an aircraft during an in-process flight. The method compares the acquired current flight parameters to the classified flight data and identifies, in real-time during the in-process flight, and based on thresholds in correlations between the acquired flight parameters and the classified flight data, preferred action(s) to take and preferred flight parameter value(s) for the in-process flight given current conditions of the aircraft and surrounding environment as reflected by the acquired current flight parameters. The method also provides the preferred flight parameter values to computer system(s) of the aircraft.

Yet further, a computer program product including a computer readable storage medium readable by at least one processor and storing instructions for execution by the at least one processor is provided for performing a method. The method obtains flight data of aircraft flights and classifies the flight data according to categories. The method acquires current flight parameters from devices of an aircraft during an in-process flight. The method compares the acquired current flight parameters to the classified flight data and identifies, in real-time during the in-process flight, and based on thresholds in correlations between the acquired flight parameters and the classified flight data, preferred action(s) to take and preferred flight parameter value(s) for the in-process flight given current conditions of the aircraft and surrounding environment as reflected by the acquired current flight parameters. The method also provides the preferred flight parameter values to computer system(s) of the aircraft.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
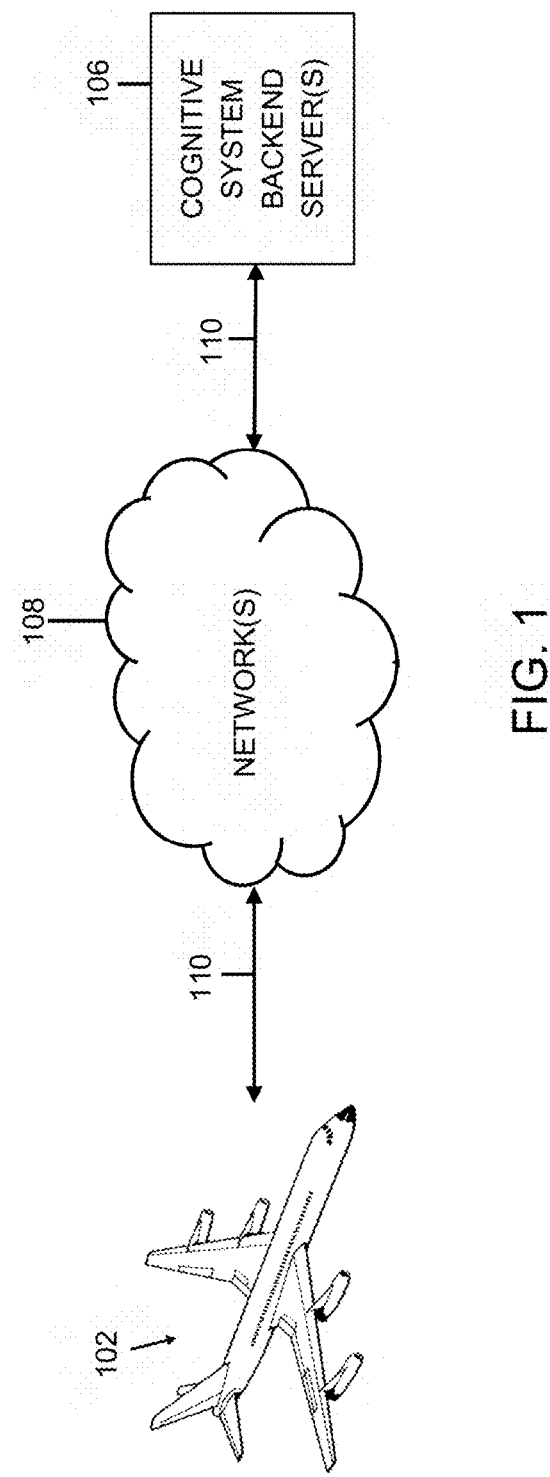
FIG. 1 depicts an example environment to incorporate and/or use aspects described herein.

Described herein are facilities that capture best practices used by experienced pilots in given conditions and share that information in real time to other pilots to enhance security, fuel efficiency, and other aspects across flights of other aircraft. Also provided are ways to leverage the data generated during flights in order to determine best actions/reactions in emergency situations experienced during in-process flights. Aspects are facilitated using cognitive technology that integrates analytics capabilities to leverage the gathered data into useful information while learning over time. Though examples described herein may be presented in the context of airplanes (one type of aircraft) it is understood that aspects described herein have a broader application, for instance to any type of aircraft.

Industrial internet and computer capabilities enable airplanes and other aircraft to perform at least some onboard analysis and/or sharing of gathered flight data to cloud-based or other terrestrial computer facilities. This is in contrast to merely gathering the data and waiting until the aircraft lands on the ground to harvest and review it. Real-time monitoring, robust compute power to support all of the on-board sensors, and other capabilities are available.

Current approaches for handling flight data have several disadvantages. They are susceptible to loss or corruption of data, they typically require dedicated experienced resources to process and analyze the data, the processing and analysis takes a significant amount of time and resources and therefore the information gleaned is obtained long after the source data was gathered, they apply limited processing capabilities for big data applications, there is a lack of automation between main components of a system such as the inputs (e.g. aircraft sensors), human analysis of the data, and the outputs (knowledge gleaned), and there is a lack of, or inefficient distribution of, any useful knowledge gleaned.

Presented herein is the use of a cognitive engine that processes flight data in real-time and creates a knowledge database with relevant, useful flight practice information, rather than merely a set of big data that by itself fails to inform of any viable real-time applicability. A useful analogy is to the familiar DIKW pyramid and knowledge hierarchy, representing the relationship between 'data' at the bottom of the pyramid, 'information' above that, 'knowledge', and 'wisdom' at the top of the pyramid. In the present context, raw data may be analyzed to acquire the information, which is analyzed to create knowledge and best practices for aircraft flight parameters in given situations. A real-time aspect may be significant because of its applicability to in-process flights, i.e. to provide recommendations during a flight to proactively address an undesired situation, rather than a post-hoc analysis of the undesired situation only after it has been experienced.

Aspects described herein can provide real-time suggestions to the aircraft crew (pilot(s) and/or other personnel) leveraging a database of best practices created based on the experience of pilots, sensor information, previous actions in similar situations, and other items. Real-time suggestions may be with regard to flight parameters (speed, direction, path, and any other parameters including pilot actions, maneuvers, and so on). For instance, parameters that are found to result in fuel saving for the aircraft given current flight parameters may be provided as suggested preferred flight parameters.

FIG. 1 depicts an example environment to incorporate and/or use aspects described herein, such as an environment in which a cognitive system is leveraged in the capture and distribution of experience and knowledge. Airplane 102 is in communication with cognitive system backend server(s) 106 via network(s) 108. In practice, airplane 102 includes components such as sensors, computer systems, or the like that communicate with components of network(s) 108.

Cognitive system backend server(s) 106 are computer systems and associated modules that provide a backend to a cognitive system described herein. The cognitive system backend provides a robust cognitive processing and analysis engine that may sit remote from other components, such as those of the airplanes and associated components that provide data to the cognitive system and/or leverage its capabilities in providing guidance for flight scenarios. An example cognitive system backend is the IBM Watson line of offerings from International Business Machines Corporation, Armonk, N.Y., U.S.A. Thus, in some examples, this backend is provided as a cloud service hosted on a cloud platform.

Airplane 102 and cognitive system backend 106 are in communication with, and communicate via, one or more intervening networks 108 over wired and/or wireless communication links 110, such as wired and/or cellular, satellite, Wi-Fi, or other types of wireless connections. More generally, communication links 110 may be any appropriate wireless and/or wired communication link(s) for communicating data.

Figure 2:
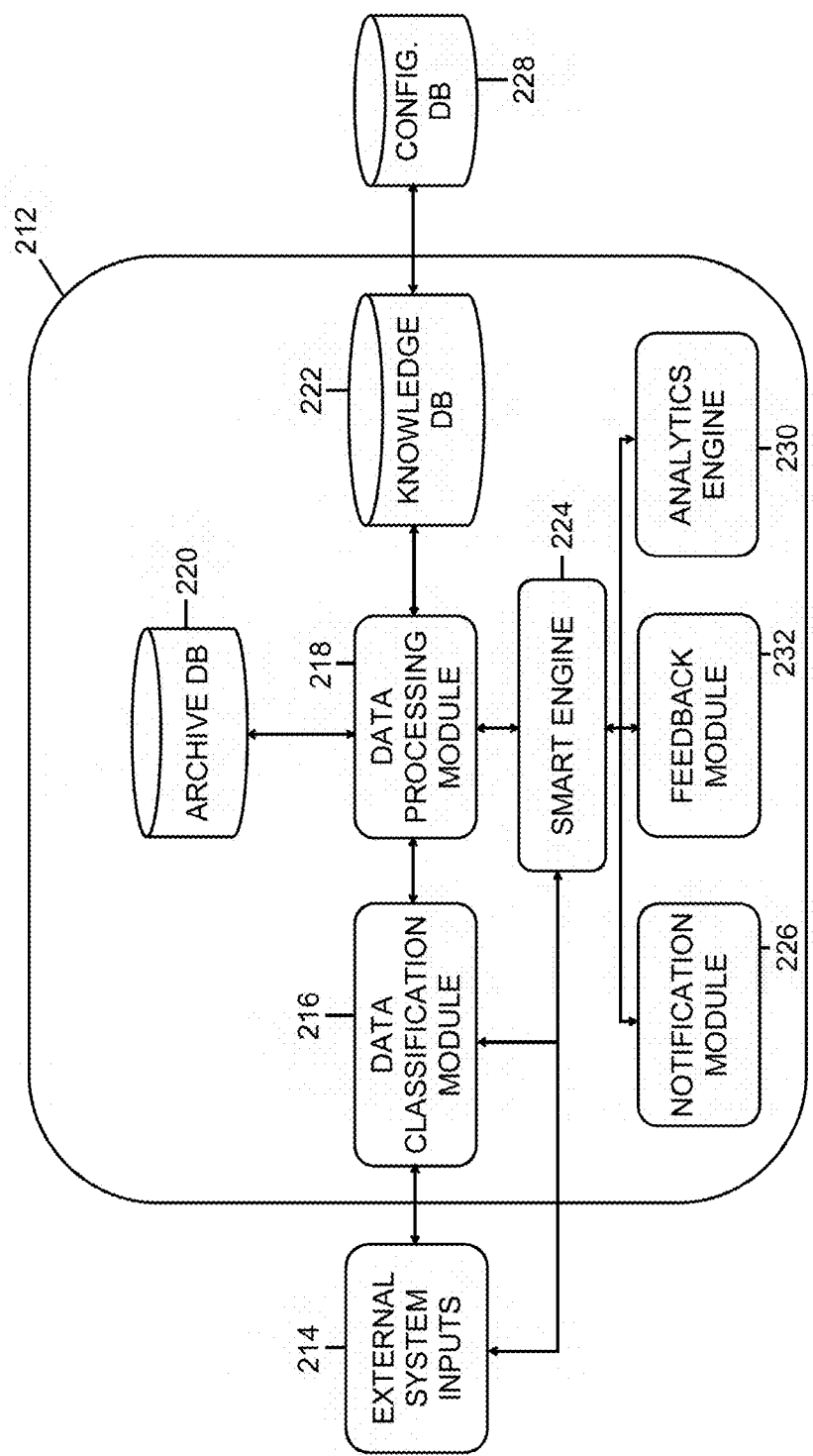
FIG. 2 depicts an example conceptual architectural diagram showing components for capture and distribution of experience and knowledge based on prior flights, in accordance with aspects described herein.

FIG. 2 depicts an example conceptual architectural diagram showing components for capture and distribution of experience and knowledge based on prior flights, in accordance with aspects described herein. Components of FIG. 2 are implemented in some examples as software, hardware, or a combination of the two. Two or more components may be implemented by a single entity, such as a single computer system if desired. In general, the components of FIG. 2 may be distributed as one or more computers and associated storage components across one or more airplanes and a cloud facility or other ground facility. Arrows between components of FIG. 2 represent data communication paths for the communication of data therebetween. Example data communication paths include memory, network and/or computer bus connections.

Cognitive system/engine 212 includes various components described below. In some examples, one or more components of cognitive system 212 may be loaded on the airplane, enabling a level of onboard analysis of data and information. This may be employed in some cases where the potential for delays or data corruption resulting from data transmission are a concern. In other examples, such as those where it is impractical to supply the needed computational resources onboard the airplane, components of the cognitive system are provided by one or more facilities remote from the airplane.

External system inputs 214 may be sensors and/or computer systems of airplanes and the components of cognitive system 212 may be hosted at a cloud or other facility on the ground, though in other examples, one or more components of cognitive system 212 are loaded on the airplanes instead of being co-located with the other components of the cognitive system.

External system inputs 214 refer to inputs that are received by the cognitive system 212 and/or the systems providing such inputs. These include, for example and not limited to, airplane sensors, indications of pilot actions, flight plans, airplane computer systems, inputs from airplane crews, and data from ground stations. It is noted that these inputs may include systems that interpret sensor values into more readable or practical values (e.g. via parsing, organizing, etc.). Though in some examples pure sensor data may be an input, generally pure sensor data may not be very manageable. Some systems on airplanes can processes the acquired sensor data into useful information that is input to cognitive system 212.

Fight data, for example in the form of flight parameters, of aircraft flights is obtained from the external system inputs. This is obtained on an ongoing basis as airplane flights are in-process. In-process refers to an ongoing flight, which may encompass the airborne portion of a flight as well activities while on the ground. Thus, flight parameters of current in-process flights are acquired from devices of the airplanes during in-process flights. Flight parameters include values or properties of a flight of an actual aircraft during a flight thereof. Examples of flight parameters are values/indications for speed, altitude, and other characteristics of the movement of the aircraft, control values of specific controls of the aircraft, a flight plan, indications of pilot actions, and so forth. These are obtained from devices of the aircraft, such as aircraft sensors and/or one or more aircraft computer systems. Some parameters may be inputs made by a crew member and indicated to a computer system of the aircraft and then provided to the cognitive system.

In some aspects, data from the external system inputs 214 are input to the data classification module 216. This module can handle classification of the 'big data' from aircrafts, the classification being to facilitate better handling. Classification can include data grouping, categorizing, tagging or the like for the purpose of easier data mining, for example. The classification may classify the flight data according to one or more categories, examples of which include sensor type, airplane type, flight route, weather, and pilot actions, as examples. Pilot actions may be useful for learning effective and ineffective strategies for handling emergency situations, to enable identification of safe and effective actions to take in given emergency situations.

Classified data is provided in some aspects to data processing module 218, which can process the data by saving relevant information into the knowledge database 222. What is relevant may be dictated by user configuration and/or machine learning, as examples. For instance, an altimeter (an example sensor) may provide a data point representing altitude every 1 second. If altitude remains the same for a relatively long time, say 10 minutes, data processing module may process the altitude data for the 10 minutes (600 data points) down to some minimal indication, 'altitude=X from 14:37.00-14:47.00'. Example data processing includes sorting and consolidating the classified data.

Data processing module 218 can also save other useful data to an archive database 220. Particular airlines, system administrators, governmental organizations, or other stakeholders may desire to save arbitrary data or other information that is gathered by the cognitive system. The data may be used by an airline for business purposes, for instance to track fuel efficiency by pilot in order to award incentives to fuel-efficient pilots. Thus, at least some flight data may be saved/stored/archived to a prespecified database. This may be based on any desired parameters. As examples, preconfigured parameters may be specified by an airline or other entity for desired archiving activities. Suggestions for which flight data to archive may also be presented by the cognitive engine for instance based on its machine learning, the suggestions being ones that the cognitive system ascertains may be helpful or useful aside from its other objective of identifying preferred flight parameters.

Data is continually collected during flights and therefore includes data collected before, during, and after actions taken by crew members. It also reflects flight parameters experienced in both desirable and undesirable situations. The cognitive engine can therefore process the flight data of aircraft flights to build the knowledge database with information that is useful, for instance informing of desired or preferred actions and/or preferred flight parameters in different flight scenarios. If an outcome of a situation was undesirable—a rough landing, abnormal amount of fuel consumption, or poor pilot negotiation of encountered turbulence, as examples—the processed data can reflect this to inform of flight parameters and/or pilot actions that should be avoided in the same or similar situations. Conversely, if a particular flight experiences exceptionally low fuel consumption based on an unconventional flight plan, the data will reflect this and the cognitive system can identify a correlation between those conditions (flight plan, particular aircraft, weather conditions, etc.) and the resulting efficient fuel consumption.

The knowledge database 222 stores the information informing of preferred actions and flight parameters in different flight scenarios, and can do so with any desired granularity. For example, the information could correspond to a particular airline or any collection of airlines, a single airplane model or particular airplane models, and so forth. In this manner, the data is gathered and analyzed, knowledge is attained and stored, sorted, or confined to a particular granularity to which it applies. A best practice for one model airplane may not be applicable to another model airplane. Knowledge from flights of one airline may be inaccessible to other airlines unless shared, for instance. However, in a particular embodiment, the cognitive system and knowledge database is made available to any entity that desires it. A third party may maintain the cognitive system and knowledge thereof may be made available to customers (e.g. airlines) that desire the information, for instance.

Accordingly, the cognitive system can maintain preferred flight parameter values indicative of best practices based on sensor information and the experience and prior actions of pilots during prior-experienced flight scenarios. In some aspects, expert or experienced users may add additional knowledge (e.g. best practices) items to a database. By way of specific example, aircraft manufacturers, users, servicers, or the like may contribute additional best practices to the system.

The knowledge generated by the system could be used to feed other systems, such as flight simulator software and/or airline's autopilot features, to convey pilot best practices based on real events. Indications of preferred actions to take and preferred flight parameter values may be provided to flight simulator software or to control autopilot features to indicate pilot best practices to take during simulated flight scenarios.

Smart engine 224 can obtain flight data from any of a variety of components, for instance the data processing module 218, classification module 216 or external system inputs themselves. Data that has been classified/cleaned may be more immediately useful to the smart engine, though it may be worthwhile for the smart engine to have access to the external systems to obtain raw data therefrom if data is missing or is needed for deeper processing. The knowledge database 222 can also provide useful information used by the smart engine 224 in its processing, as the knowledge database stores the 'scenario data' of flights, including one or more in-process flights. In one particular scenario, the smart engine is loaded on a computer system of the aircraft and data from the knowledge database is streamed to it from the cloud.

One role of the smart engine is to check actual data incoming for an in-process flight against the information in the knowledge database to look for coincidences or similarities between the in-process flight and prior flights for which knowledge has been acquired. This is performed in real-time, i.e. during an in-process flight.

In one aspect, flight parameter values in the knowledge database have weights assigned to them depending on their relevance. Acquired current flight parameters (e.g. parameter values) of the in-process flight cam be compared to these weighted flight parameter values in the knowledge database to identify matches. Tolerance levels can be set to dictate what constitutes a match between values. For instance, an acquired flight parameter value of a given parameter (say aircraft speed) may be considered a match to a weight flight parameter value in the knowledge database if the two values are within some number of units (15 knots) or vary within some percentage (15%) of each other. There is therefore a correlation performed of the acquired current flight parameters to the weighted flight parameter values in the knowledge database. Then, weights are established for the acquired current flight parameters based on the weights of the correlated weighted flight parameter values in the knowledge database. The weights of the current flight parameters are reduced, proportionally in some examples, if the acquired current flight parameter is not the same as the matched flight parameter.

An approach is presented for determining whether current conditions being experienced by an in-process flight correlate to preferred flight actions/parameters that may be suggested. In this approach, the weights of the current flight parameters are aggregated (e.g. summed) and if the total meets or exceeds a threshold, the system will trigger an alert to the notification module 226. In situations where there are multiple parameters or parameter sets that exceed respective threshold(s), there may be a relevancy associated with them and their correlated flight actions/parameters, which may be presented sorted by relevance.

Thus, there is a comparison of current flight data/parameters with values in the knowledge database to identify matches. The values in the knowledge database are weighted, and those weights are scaled by some factor when assigning weights to the acquired flight parameter values. The scaling may depend on how close the matching current flight data value is to the value in the knowledge database. Then there is a determination of whether the weights of the weighted acquired current flight parameters exceed threshold(s) in correlating those acquired current flight parameters to the flight parameter values in the knowledge database. Exceeding a threshold indicates that the situation being currently experienced correlates to one that has been indicated in the knowledge database. Accordingly, preferred actions and preferred flight parameters may be identified and preferred flight parameter values provided based on the weighted acquired current flight parameters exceeding such threshold(s).

The thresholds can be set in any desired manner. User/admin input in the form of configuration information of the configuration database 228 is one example. Thresholds can also have different granularities of applicability—for example they may be airline-specific or airplane-model specific, as examples. They may also be specific to individual pilots or classification of pilots (beginner, novice, expert). Thresholds may be selected based on type of flight, type of aircraft, a type of route, and/or any other parameter.

Configuration database 228 can also house settings for users like expert or experienced users to adjust the weights of the flight parameter values in the knowledge database. Other settings, such as maximums, minimums, and baselines settings for values in the knowledge database can also be stored in the configuration database.

By way of specific example to illustrate, assume actual data (current flight parameters of an aircraft during an in-process flight) are the following:
Wind Speed: 200 km/h;
Aircraft weight: 114 Tons;
Aircraft type: A320;
Route: LA-SJO;
and assume that information in the knowledge database includes the following, with weights indicated in parentheses:
Wind Speed: 200 km/h (4);
Aircraft weight: 110 Tons (8);
Aircraft type: : A320 (6);
Route: LA -MIA-SJO (8)
Assume the following weights are assigned to the current flight parameters based on the weights of the information in the knowledge database and on a scaling factor for scaling the weights assigned to the current flight parameters:
Current wind speed—weight points: 4 out of 4, because current wind speed is identical to the wind speed in the database;
Aircraft weight—weight points: 6 out of 8 because current aircraft weight is 114 tons, heavier than the 110 tons of the value in the database;
Aircraft type—weight points: 6 out of 6 because current aircraft type is the same as aircraft type in the database;
Route—Weight points: 7 out of 8 because the current court includes an additional stop (MIA).
A total coincidence score is the sum of the weights of the current flight parameters, here 23 points because 4+6+6+7=23.

Assume the established threshold for this correlation is 20 points. The coincidence score of 23 meets or exceeds the establish threshold of 20. Therefore, an alert may be triggered with recommendations gleaned from the information in the knowledge database, for instance preferred actions/flight parameters associated with the scenario in the knowledge database represented by the flight parameters above.

As noted, recommendations may be to avoid a potentially undesirable situation or pursue a more desirable situation (e.g. lower fuel consumption). The recommendations can be ascertained based how/whether pilot actions and/or flight parameters of those prior flights, as ascertained from the gathered data and information stored in the knowledge database, resulted in desirable or undesirable outcomes. Whether particular outcomes, conditions, or parameter values are desirable or undesirable can be indicated in any of several ways. They may be based on administrator input to indicate desirable or undesirable situations, values, outcomes, etc. They could additionally or alternatively be learned by the cognitive system. For instance, the system could learn that particular maneuvers, altitude changes, or any other information gleaned from flight parameters are not good because they result in undesired outcomes. In this regard, there may be a re-train process of the system. If a pilot applies a suggestion and the result is unfavorable, the cognitive system will "learn" from that experience and may decrease the points, weight or applicability of the recommendation to that scenario.

Processing can compare acquired current flight parameters to the classified flight data and identify, in real-time during the in-process flight, and based on threshold(s) in correlations between the acquired flight parameters and the classified flight data, preferred action(s) to take and preferred flight parameter value(s) for the in-process flight given current conditions of the aircraft and surrounding environment as reflected by the acquired current flight parameters. The comparison noted constitutes a comparison of the situations (current vs. prior experienced) based on weight values assigned, to determine whether the situations are 'close', as dictated by the threshold. In some embodiments, the preferred actions to take may be adjustments to parameters (altitude, speed, etc.) of the aircraft and the preferred flight parameter values may be the indications of the where to set those parameters. It is understood that many flight parameters may be within the control of the pilots or crew, who may manually (or cause a computer to automatically) adjust the parameters. The preferred flight parameter values can indicate pilot/crew actions in controlling the aircraft.

In this manner, comparing the acquired current flight parameters to the classified flight data compares the acquired current flight parameters against the information in the knowledge database for similarities (e.g. proximity in value) between the current flight parameters and those of flight scenarios reflected in the knowledge database information, to identify the preferred flight parameter values for the in-process flight.

In another embodiment, a pilot or other user can make ad-hoc requests for the cognitive system to look for suggestions based on a current situation. As part of the cognitive system's ongoing processing, it may be continually looking for opportunities to suggest preferred actions and flight parameters to in-process flights. However, some situations that may reflect an obvious emergency to flight personnel may not be automatically detected as an issue by the cognitive system. Ad-hoc or on-demand requests in such situations can drive the system to consider the set of conditions in situations that are not necessary observed or recognized by the system as emergencies. The cognitive system can look into the knowledge database for any situations that have similar parameters. In some examples, it may disregard its standard thresholds and use a different set of thresholds that are configured to allow more leeway in finding comparable prior situations. If the system identifies similar prior situations, it may provide recommendations as described above. For instance, it may look for pilot actions in similar situations with positive or successful results, and present those actions as suggestions to the pilot of the in-process flight. Additionally or alternatively, the ad-hoc requests can serve as a selection by the pilot/crew to record the actions performed by a pilot in the given situation (such as a pilot-recognized emergency) for further replication. As noted, the cognitive system may not always know that a given situation was/is an emergency and thus the actions performed by the pilot may not be recorded as a best practice. Enabling ad-hoc requests as above may dictate to the system that the actions to be performed in the situation should be observed and potentially analyzed/stored to inform best practices in subsequent flights.

The above ad-hoc approach may be particularly useful in providing guidance or recommendations in emergency situations to less experienced pilots.

The cognitive system can record pilot actions in the form of recorded flight data for identified emergency situations. At least some of the flight data processed by the system to help build the knowledge database includes these recorded pilot actions and, in some cases, the preferred actions include the recorded pilot actions that were identified as leading to successful or best-case outcomes.

Continuing with the description of FIG. 2, the notification module 226 is responsible for displaying/send notifications to pilots/crew members, as triggered by the smart engine 224. Thus, the notification module provides the preferred flight parameter values to the aircraft during the in-process flight, and specifically to one or more computer systems or other devices of the aircraft. In some embodiments, the preferred flight parameter values may be prioritized, sorted by importance, or arranged by applicability to the crew of the aircraft. In this latter regard, suggested parameters or actions may be intended for selection/implementation by different crew members depending on the controls or devices under their purview. Additionally or alternatively, in some embodiments the notification module can also provide/display data in a remote location, such as a ground facility of the airline (like headquarters) or air control towers, to provide indications to others outside of the flight personnel who may be interested in knowing the data provided by the cognitive system to the in-process flight.

The notifications are sent to the aircraft, e.g. a computer system thereof and preferably in real-time so that corrections or adjustments can be made. In some embodiments, some adjustments are made automatically, e.g. by a controller or computer system of the aircraft. Ultimately the pilot(s) may have authoritative control over any and all adjustments made based on the preferred or suggested flight parameter values. In particular embodiments, implementation of adjustment(s) may be performed based on the presentation of the preferred flight parameter values to the crew and one or more crew members selecting/confirming that the adjustment(s) are to be implemented.

Thus, there may be an implementation of adjustment(s) to one or more devices of the aircraft to achieve one or more of the received preferred flight parameter values. In other words, there may be some level of control that the crew exhibits over some flight parameter values of the in-process flight. The control may be realized by making adjustments to devices of the aircraft. By way of example, the angle of attack of the wing flaps may be controlled by the pilot and a received preferred parameter value might indicate a larger angle than a current angle of attack. An adjustment may be made to the wing flaps by way of an adjustment to the controller thereof In some situations, recommended actions or parameter values may serve to control aircraft control system automatically, i.e. without manual implementation, confirmation, or invocation by flight personnel.

The feedback module 232 allows administrator/user input to the system in order to improve (curate) the data and enhance the system and results. Example input includes admin/user specifications or tagging of positive and negative scenarios and outcomes into the knowledge database. In some aspects, the input may create baselines that the cognitive system uses to learn and then refine over time based on machine learning.

The analytics engine 230 can invoke analytics and generation of reports as configured by users.

The configuration database 228 can store the relevant configuration settings of the cognitive system. Weights, thresholds, location (in-air vs. on ground) of software components of the cognitive engine, and any other settings can be configured in this database. Settings can have differing granularities in terms of their applicability. For instance as described previously, different configuration settings may be provided for different airlines or different aircraft, as examples.

Figure 3:
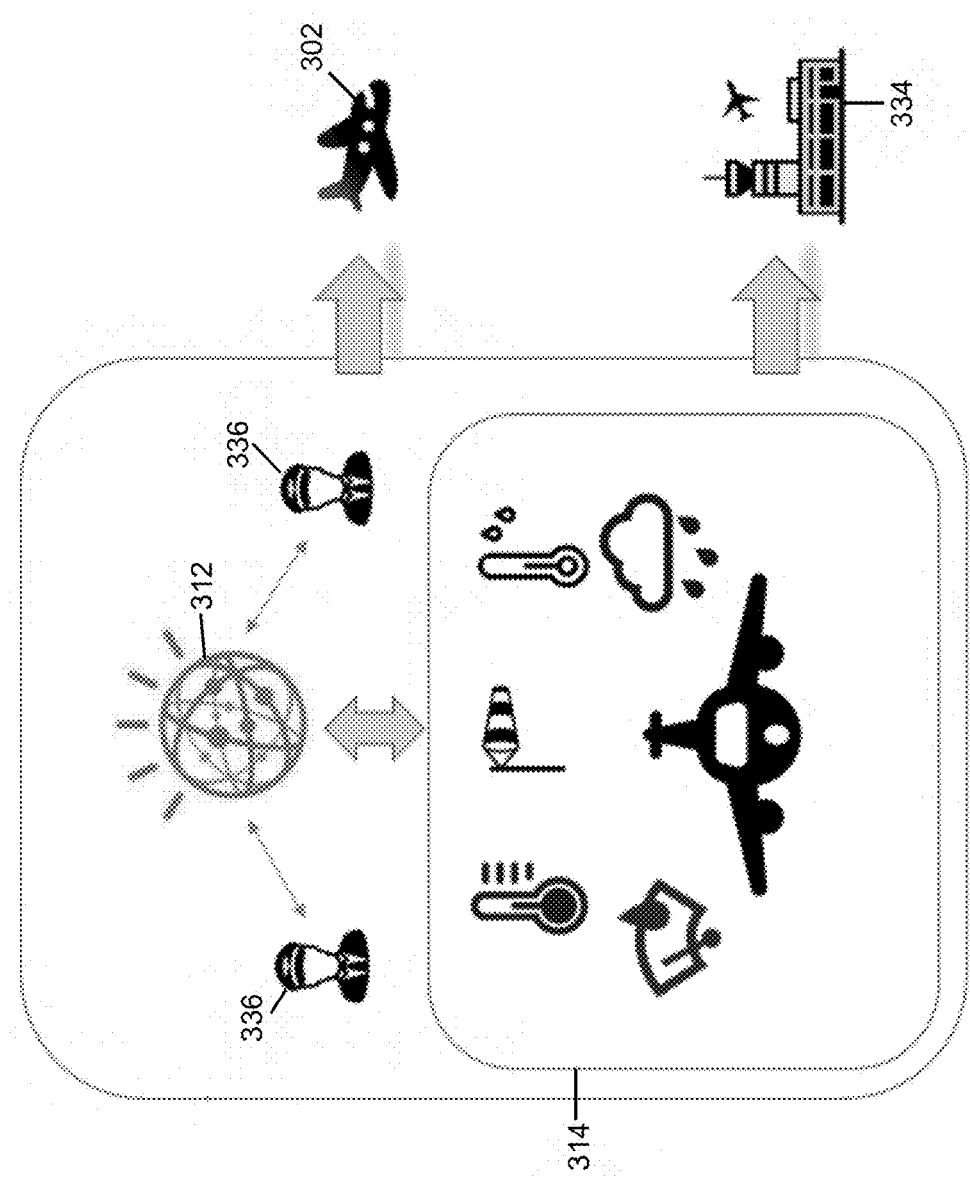
FIG. 3 depicts an example conceptual overview of information sharing in the capture and distribution of experience and knowledge based on prior flights, in accordance with aspects described herein.

FIG. 3 depicts an example conceptual overview of information sharing in the capture and distribution of experience and knowledge based on prior flights, in accordance with aspects described herein. Many of the aspects depicted in FIG. 3 have been described previously. Knowledge and information in the form of data are exchanged between the cognitive system 312 and pilots/users 336. For instance, the cognitive system gathers flight data that includes parameter values and pilot actions for various scenarios. The cognitive system leverages the data collection of onboard sensors and other external system inputs 314 to acquire data. Outputs of the cognitive system flow to ground facilities 334, e.g. air traffic control stations, cloud computing facilities, data centers or the like. Meanwhile, information flows to airplanes 302 in the form of recommended preferred flight parameter values for possible adjustments of in-process flights to achieve desired positive outcomes.

Aspects described herein can improve safety, threat response, and possibility of positive outcomes in emergency situations by way of real-time suggestions, reduce risk based on human errors, enable the sharing of expertise between airline personnel, provide support to the personnel crew in case of communication issues with ground stations (e.g. in cases where components of the cognitive system are onboard), leverage real-time information by ground operations to improve their estimations and plans, and save storage resources by storing relevant information, as opposed to the entire collection of gathered raw data, that can be potentially of use in the future.

Aspects can provide real-time recommendations based on current conditions of an in-process flight and the surrounding environment, create a cognitive knowledge database of best practices based on real situations faced by pilots, share knowledge and best practices between pilots, and record helpful pilot actions in emergency situations, which actions can be shared and replicated by less experienced users.

Accordingly, data is fed to a cognitive engine to create knowledge that can be distributed between key players to help decision-making for in-process flights. Aspects differ from approaches of merely sending gathered information for offline processing. Sensor and other flight data is transformed into information and knowledge with the use of a cognitive system, then applied to further flight scenarios in real-time for live guidance.

Figure 4:
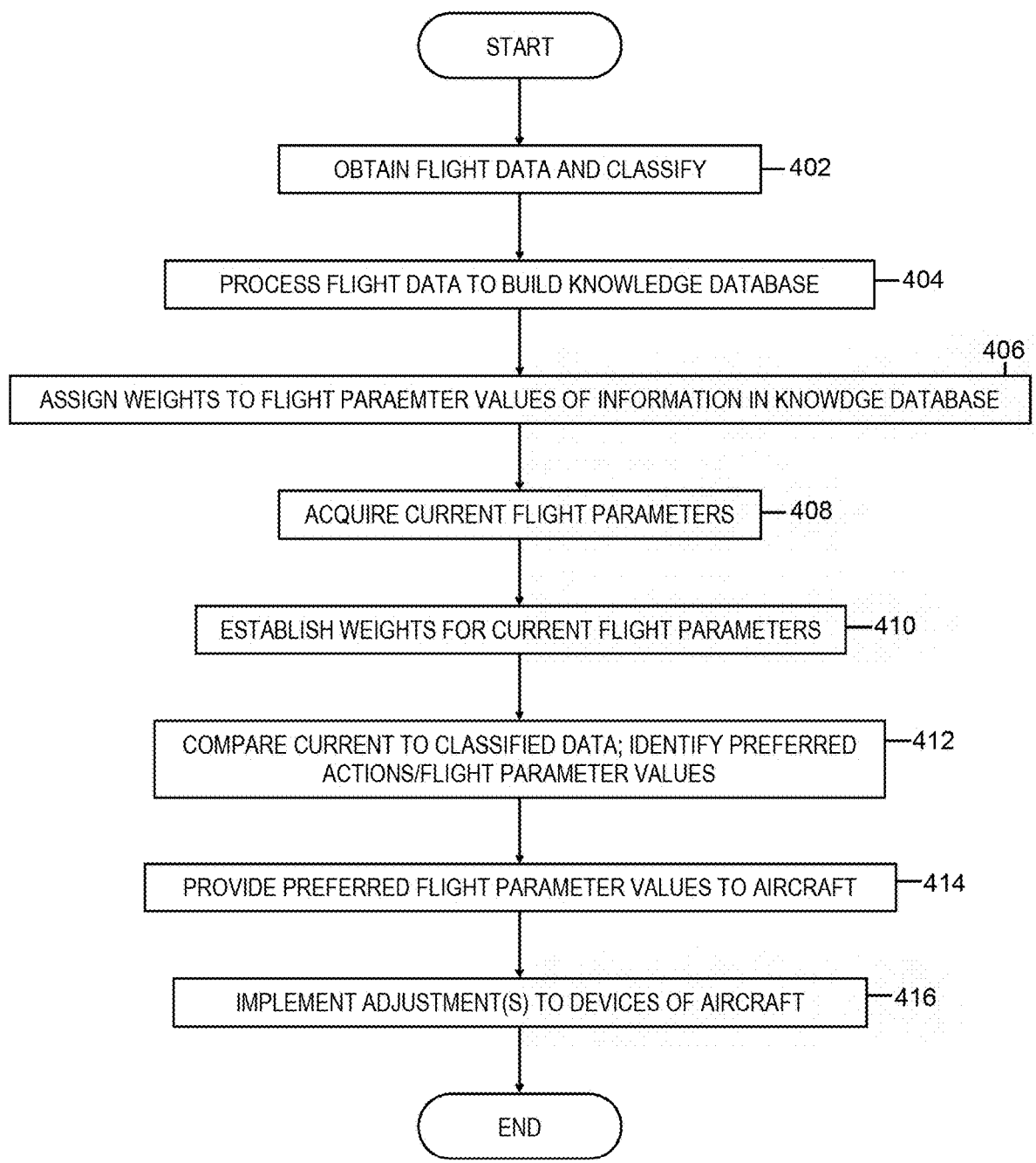
FIG. 4 depicts an example process for real-time identification and provision of preferred flight parameters, in accordance with aspects described herein.

FIG. 4 depicts an example process for real-time identification and provision of preferred flight parameters, in accordance with aspects described herein. In some examples, the process is performed by one or more computer systems, such as those described herein, which may include one or more computer systems of an aircraft, one or more cloud servers, and/or one or more other computer systems.

The process begins by obtaining flight data of a plurality of aircraft flights and classifying the flight data according to a plurality of categories (402). In some examples, the classifying according to the plurality of categories classifies by one or more of the following: sensor type, aircraft model, flight route, weather, and pilot actions.

The process continues by processing the flight data of the plurality of aircraft flights by a cognitive engine (404) to build a knowledge database having information informing of a plurality of preferred actions and preferred flight parameters in a plurality of flight scenarios. In some aspects, this processes the classified data to discard data values of the obtained flight data and obtain the knowledge database information. In some embodiments, at least some flight data—perhaps some that would otherwise be discarded—is archived to a prespecified database. This archiving feature may be based on a plurality of parameters, for instance preconfigured parameters for desired archiving activities. Additionally or alternatively, at least some of the flight data may be archived based on suggestions presented by the cognitive engine to an administrator or other user, the suggestions being ones that the cognitive system ascertains may be helpful or useful aside from the identification of preferred flight parameters.

The process also assigns weights to flight parameter values of the information in the knowledge database (406) and acquires current flight parameters from a plurality of devices of an aircraft during an in-process flight (408). The plurality of devices of the aircraft include, as examples, sensors and aircraft computer system(s). The process correlates the acquired current flight parameters to the weighted flight parameter values in the knowledge database and also establishes weights for the acquired current flight parameters based on the weights of the correlated weighted flight parameter values in the knowledge database (410). In some aspects, configuration settings are provided (for instance by/in the configuration database) for expert users to adjust the weights and any baseline settings for values in the knowledge database, as desired.

The process compares the acquired current flight parameters to the classified flight data and identifies, in real-time during the in-process flight, and based on thresholds in correlations between the acquired flight parameters and the classified flight data, one or more preferred actions to take and preferred flight parameter values for the in-process flight given current conditions of the aircraft and surrounding environment as reflected by the acquired current flight parameters (412). The preferred flight parameter values may be indicative of best practices based on the experience and prior actions of pilots, and on sensor information, during prior-experienced flight scenarios. Additionally, the preferred flight parameter values may indicate pilot actions in controlling the aircraft.

Comparing the acquired current flight parameters to the classified flight data can compare the acquired current flight parameters against the information in the knowledge database for similarities between the current flight parameters and flight scenarios reflected in the information, for example to identify the preferred flight parameter values for the in-process flight.

In some aspects, a determination is made about whether the weights of the weighted acquired current flight parameters exceed one or more thresholds in correlating the acquired current flight parameters to the flight parameter values in the knowledge database. The identification of the preferred actions and preferred flight parameters and the providing the preferred flight parameter values may be performed based on the weighted acquired current flight parameters exceeding the one or more thresholds. Threshold(s) may be selected based on type of flight, type of aircraft, and/or type of route, as examples.

The method provides the preferred flight parameter values to one or more computer systems of the aircraft (414). As an example, the method presents the preferred flight parameter values sorted by importance and applicability to a crew of the aircraft. The process then implements one or more adjustments to a respective one or more devices of the aircraft, for instance to achieve at least one of the preferred flight parameter values (416). In some embodiments, the implementation of any adjustment(s) to device(s) to achieve preferred flight parameters may be made based on affirmative confirmation from crew members, if desired. For instance, the implementing of the adjustment(s) (416) may be performed based the presentation (414) of the preferred flight parameters and on receiving a selection from one or more such crew members to implement the adjustment(s).

In addition to the above, aspects can record pilot actions in emergency situations in the form of recorded flight data. Some of the processed flight data can therefore include the recorded pilot actions and at least some of the preferred actions can include the recorded pilot actions.

As an enhancement, indications of the one or more preferred actions to take and the preferred flight parameter values may be provided to flight simulator software to indicate pilot best practices to take during simulated flight scenarios.

Although various examples are provided, variations are possible without departing from a spirit of the claimed aspects.

Figure 5:
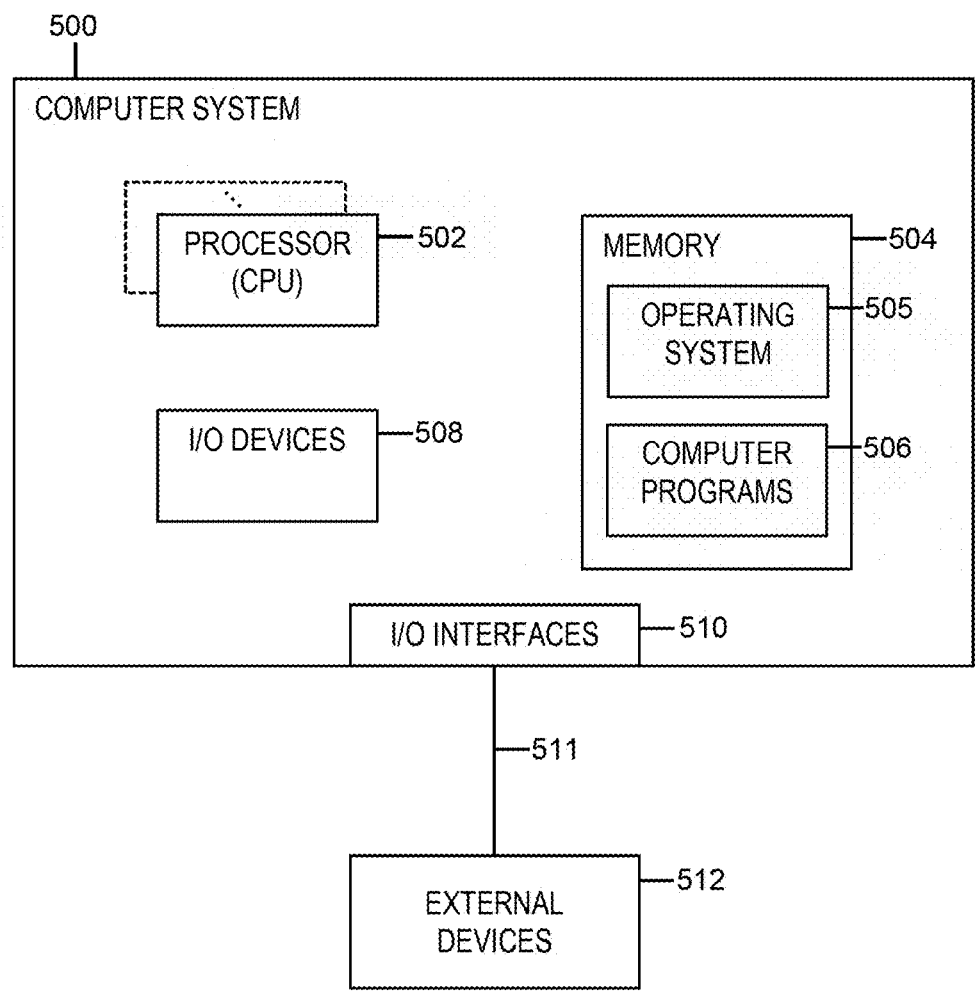
FIG. 5 depicts one example of a computer system and associated devices to incorporate and/or use aspects described herein.

Processes described herein may be performed singly or collectively by one or more computer systems, such as one or more computer systems of a cognitive system, one or more computer systems of aircraft, and/or a combination of the foregoing, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 6.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
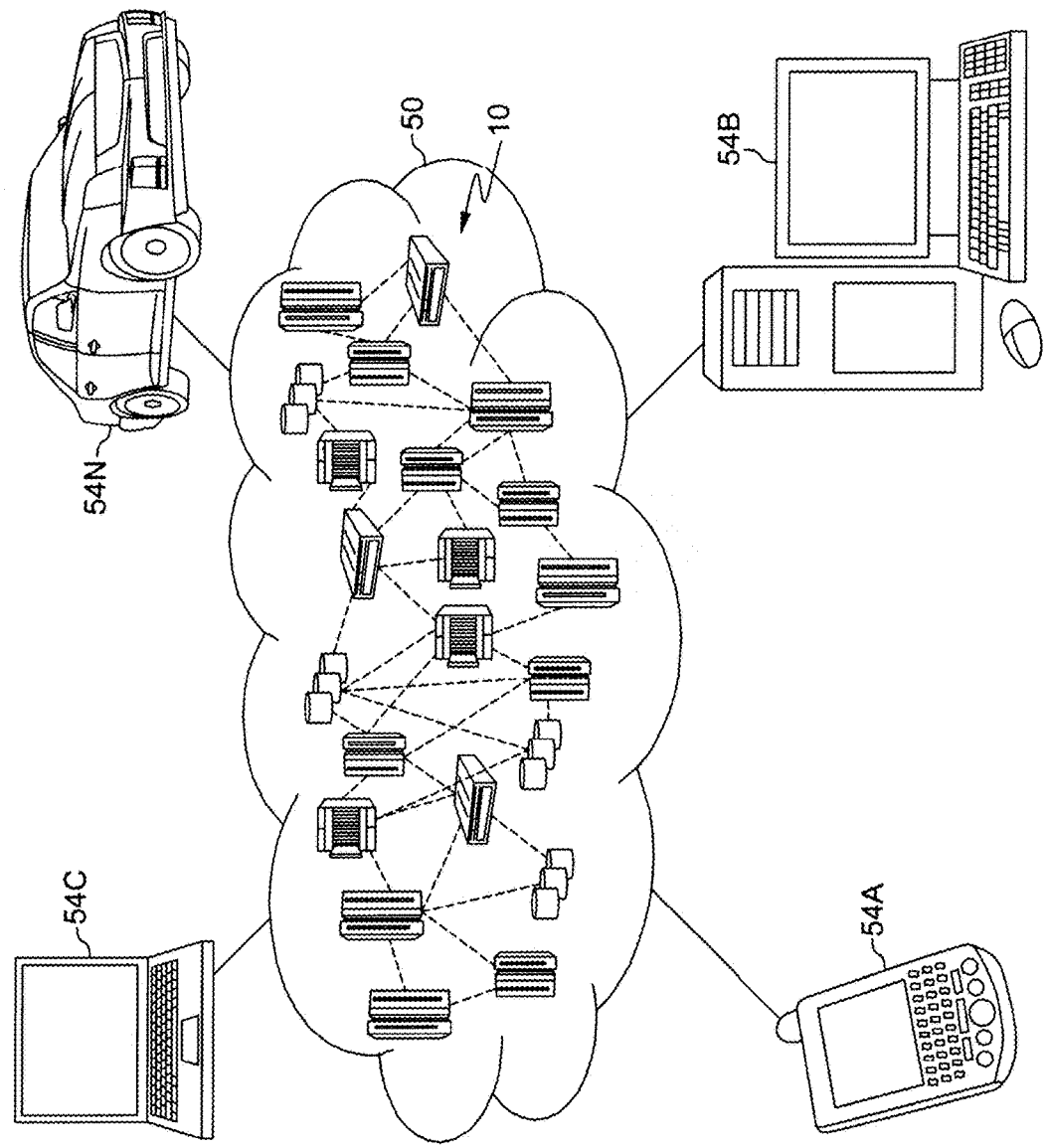
FIG. 6 depicts a cloud computing environment according to an embodiment of the present invention.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
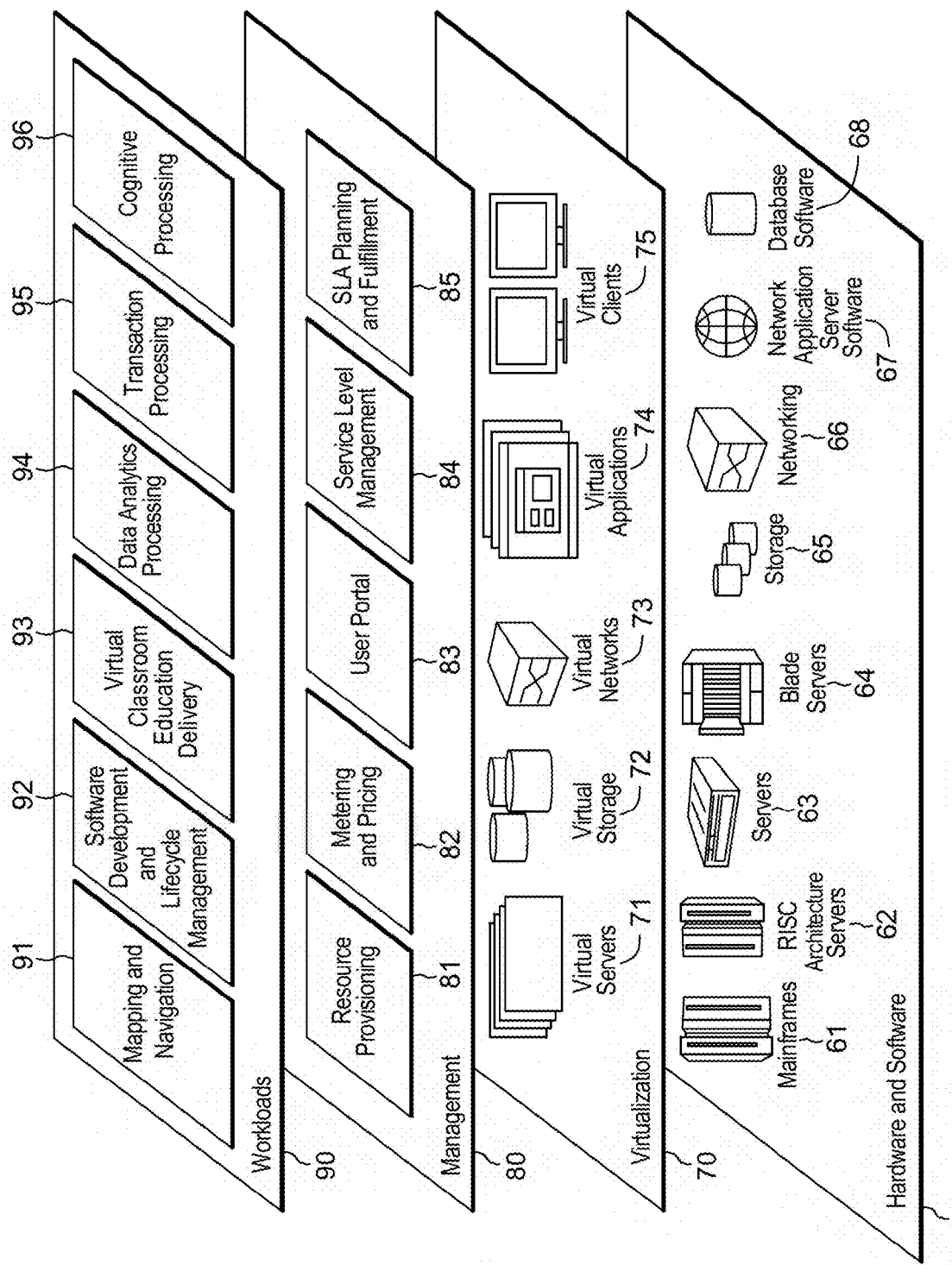
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive system processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    obtaining flight data of a plurality of aircraft flights and classifying the flight data according to a plurality of categories;
    acquiring current flight parameters from a plurality of devices of an aircraft during an in-process flight;
    comparing the acquired current flight parameters to the classified flight data and identifying one or more preferred actions to take and preferred flight parameter values for the in-process flight given current conditions of the aircraft and surrounding environment as reflected by the acquired current flight parameters, wherein the comparing and identifying are performed in real-time during the in-process flight, and wherein the identifying comprises applying pre-set thresholds in identifying whether correlations exist between the acquired flight parameters and the classified flight data, wherein exceeding a pre-set threshold indicates situational correlation between the in-process flight, as characterized by the current flight parameters, and a situation indicated by the acquired classified flight data;
    presenting the preferred flight parameter values sorted by importance and applicability to a crew of the aircraft, and
    implementing an adjustment to one or more devices of the aircraft to achieve at least one preferred flight parameter value of the preferred flight parameter values, wherein the implementing is preformed based on the presenting and on receiving a selection from one or more crew members to implement the adjustment.

2. The method of claim 1, wherein the preferred flight parameter values are indicative of best practices based on the experience and prior actions of pilots, and on sensor information, during prior-experienced flight scenarios.

3. The method of claim 1, further comprising processing the flight data of the plurality of aircraft flights by a cognitive engine to build a knowledge database having information informing of a plurality of preferred actions and preferred flight parameters in a plurality of flight scenarios.

4. The method of claim 3, further comprising recording pilot actions in emergency situations in the form of recorded flight data, wherein at least some of the processed flight data comprises the recorded pilot actions and at least some of the preferred actions include the recorded pilot actions.

5. The method of claim 3, wherein the comparing the acquired current flight parameters to the classified flight data compares the acquired current flight parameters against the information in the knowledge database for similarities between the current flight parameters and flight scenarios reflected in the information, to identify the preferred flight parameter values for the in-process flight.

6. The method of claim 5, further comprising:
assigning weights to flight parameter values of the information in the knowledge database;
correlating the acquired current flight parameters to the weighted flight parameter values in the knowledge database;
establishing weights for the acquired current flight parameters based on the weights of the correlated weighted flight parameter values in the knowledge database; and
determining whether the weights of the weighted acquired current flight parameters exceed the pre-set thresholds in correlating the acquired current flight parameters to the flight parameter values in the knowledge database, wherein the identifying the preferred actions and preferred flight parameters and the presenting the preferred flight parameter values is performed based on the weighted acquired current flight parameters exceeding the pre-set thresholds.

7. The method of claim 6, further comprising providing configuration settings for expert users to adjust the weights and baseline settings for values in the knowledge database.

8. The method of claim 6, wherein the one or more thresholds are selected based on at least one selected from the group consisting of: a type of flight, type of aircraft, and a type of route.

9. The method of claim 3, wherein the classifying according to the plurality of categories classifies by at least one selected from the group consisting of: sensor type, aircraft model, flight route, weather, and pilot actions.

10. The method of claim 1, wherein the plurality of devices of the aircraft comprise aircraft sensors and one or more aircraft computer systems, wherein the preferred flight parameter values indicate pilot actions in controlling the aircraft, and wherein the method further comprises processing the classified data to discard data values of the obtained flight data and obtain the knowledge database information.

11. The method of claim 10, further comprising archiving at least some of the flight data to a prespecified database based on a plurality of parameters.

12. The method of claim 11, wherein the at least some of the flight data is archived based on suggestions presented by a cognitive engine.

13. The method of claim 1, further comprising providing indications of the one or more preferred actions to take and the preferred flight parameter values to flight simulator software to indicate pilot best practices to take during simulated flight scenarios.

14. A computer system comprising:
a memory; and
a processor in communication with the memory, wherein the computer system is configured to perform a method comprising:
obtaining flight data of a plurality of aircraft flights and classifying the flight data according to a plurality of categories;
acquiring current flight parameters from a plurality of devices of an aircraft during an in-process flight;
comparing the acquired current flight parameters to the classified flight data and identifying one or more preferred actions to take and preferred flight parameter values for the in-process flight given current conditions of the aircraft and surrounding environment as reflected by the acquired current flight parameters, wherein the comparing and identifying are performed in real-time during the in-process flight, and wherein the identifying comprises applying pre-set thresholds in identifying whether correlations exist between the acquired flight parameters and the classified flight data, wherein exceeding a pre-set threshold indicates situational correlation between the in-process flight, as characterized by the current flight parameters, and a situation indicated by the acquired classified flight data;
presenting the preferred flight parameter values sorted by importance and applicability to a crew of the aircraft, and
implementing an adjustment to one or more devices of the aircraft to achieve at least one preferred flight parameter value of the preferred flight parameter values, wherein the implementing is preformed based on the presenting and on receiving a selection from one or more crew members to implement the adjustment.

15. The computer system of claim 14, wherein the method further comprises processing the flight data of the plurality of aircraft flights by a cognitive engine to build a knowledge database having information informing of a plurality of preferred actions and preferred flight parameters in a plurality of flight scenarios.

16. The computer system of claim 15, wherein the method further comprises recording pilot actions in emergency situations in the form of recorded flight data, wherein at least some of the processed flight data comprises the recorded pilot actions and at least some of the preferred actions include the recorded pilot actions.

17. The computer system of claim 15, wherein the comparing the acquired current flight parameters to the classified flight data compares the acquired current flight parameters against the information in the knowledge database for similarities between the current flight parameters and flight scenarios reflected in the information, to identify the preferred flight parameter values for the in-process flight.

18. The computer system of claim 17, wherein the method further comprises:
assigning weights to flight parameter values of the information in the knowledge database;
correlating the acquired current flight parameters to the weighted flight parameter values in the knowledge database;
establishing weights for the acquired current flight parameters based on the weights of the correlated weighted flight parameter values in the knowledge database; and
determining whether the weights of the weighted acquired current flight parameters exceed the pre-set thresholds in correlating the acquired current flight parameters to the flight parameter values in the knowledge database, wherein the identifying the preferred actions and preferred flight parameters and the presenting the preferred flight parameter values is performed based on the weighted acquired current flight parameters exceeding the pre-set thresholds.

19. A computer program product comprising:
a computer readable storage medium readable by at least one processor and storing instructions for execution by the at least one processor for performing a method comprising:
obtaining flight data of a plurality of aircraft flights and classifying the flight data according to a plurality of categories;
acquiring current flight parameters from a plurality of devices of an aircraft during an in-process flight;

comparing the acquired current flight parameters to the classified flight data and identifying one or more preferred actions to take and preferred flight parameter values for the in-process flight given current conditions of the aircraft and surrounding environment as reflected by the acquired current flight parameters, wherein the comparing and identifying are performed in real-time during the in-process flight, and wherein the identifying comprises applying pre- set thresholds in identifying whether correlations exist between the acquired flight parameters and the classified flight data, wherein exceeding a pre-set threshold indicates situational correlation between the in-process flight, as characterized by the current flight parameters, and a situation indicated by the acquired classified flight data;

presenting the preferred flight parameter values sorted by importance and applicability to a crew of the aircraft, and implementing an adjustment to one or more devices of the aircraft to achieve at least one preferred flight parameter value of the preferred flight parameter values, wherein the implementing is preformed based on the presenting and on receiving a selection from one or more crew members to implement the adjustment.

20. The computer program product of claim 19, wherein the method further comprises processing the flight data of the plurality of aircraft flights by a cognitive engine to build a knowledge database having information informing of a plurality of preferred actions and preferred flight parameters in a plurality of flight scenarios.

21. The computer program product of claim 20, wherein the method further comprises recording pilot actions in emergency situations in the form of recorded flight data, wherein at least some of the processed flight data comprises the recorded pilot actions and at least some of the preferred actions include the recorded pilot actions.

22. The computer program product of claim 20, wherein the comparing the acquired current flight parameters to the classified flight data compares the acquired current flight parameters against the information in the knowledge database for similarities between the current flight parameters and flight scenarios reflected in the information, to identify the preferred flight parameter values for the in-process flight.

23. The computer program product of claim 22, wherein the method further comprises:

assigning weights to flight parameter values of the information in the knowledge database;

correlating the acquired current flight parameters to the weighted flight parameter values in the knowledge database;

establishing weights for the acquired current flight parameters based on the weights of the correlated weighted flight parameter values in the knowledge database; and determining whether the weights of the weighted acquired current flight parameters exceed the pre-set thresholds in correlating the acquired current flight parameters to the flight parameter values in the knowledge database, wherein the identifying the preferred actions and preferred flight parameters and the presenting the preferred flight parameter values is performed based on the weighted acquired current flight parameters exceeding the pre-set thresholds.

* * * * *